US006192043B1

(12) United States Patent
Rochberger (10) Patent No.: US 6,192,043 B1
(45) Date of Patent: Feb. 20, 2001

(54) METHOD OF CACHING ROUTES IN ASYNCHRONOUS TRANSFER MODE PNNI NETWORKS

(75) Inventor: Haim Rochberger, Netanya (IL)

(73) Assignee: 3Com Corporation, Santa Clara, CA (US)

( * ) Notice: Under 35 U.S.C. 154(b), the term of this patent shall be extended for 0 days.

(21) Appl. No.: 09/071,067

(22) Filed: May 1, 1998

(51) Int. Cl.[7] .......................... H04L 12/28; H04L 12/56; H04J 1/16

(52) U.S. Cl. .......................... 370/351; 370/396; 370/238

(58) Field of Search .................................. 370/216, 217, 370/218, 230, 237, 238, 244, 254, 255, 351, 355, 389, 390, 392, 395, 396–401; 709/238, 239, 241, 242, 243

(56) References Cited

U.S. PATENT DOCUMENTS

| | | |
|---|---|---|
| 5,291,477 | 3/1994 | Liew ........................................ 370/54 |
| 5,361,256 | 11/1994 | Doeringer et al. ...................... 370/60 |
| 5,420,862 | 5/1995 | Perlman ............................. 370/85.13 |
| 5,455,865 | 10/1995 | Perlman ................................. 380/49 |
| 5,483,536 | 1/1996 | Gunji et al. ......................... 370/85.14 |
| 5,491,690 | 2/1996 | Alfonsi et al. .......................... 370/60 |
| 5,495,479 | 2/1996 | Galaand et al. ........................ 370/60 |
| 5,544,327 | 8/1996 | Dan et al. ............................. 395/250 |
| 5,550,818 | 8/1996 | Brackett et al. ........................ 370/60 |
| 5,566,014 | 10/1996 | Glance ................................. 359/124 |
| 5,590,118 | 12/1996 | Nederlof .............................. 370/218 |
| 5,600,638 | 2/1997 | Bertin et al. .......................... 370/351 |
| 5,603,029 | 2/1997 | Aman et al. .......................... 395/675 |
| 5,629,930 | 5/1997 | Beshai et al. ......................... 370/396 |
| 5,649,108 | 7/1997 | Spiegel et al. ................... 395/200.12 |
| 5,673,263 | 9/1997 | Basso et al. .......................... 370/396 |
| 6,016,319 | * 1/2000 | Kshirsagar et al. .................. 370/410 |
| 6,094,687 | * 7/2000 | Drake, Jr. et al. ................... 709/241 |

OTHER PUBLICATIONS

Perlman, R., "Interconnections: Bridges and Routers", Addison–Wesley Publishing, Section 9.2.4, Chapter 9, pp. 205–264 (1992).

Sedgewick, R., "Algorithms", Second Edition, Addison–Wesley Publishing, Chapter 17, pp. 245–257 (1988).

Doeringer, W. et al., "Routing on Longest–Matching Prefixes", IEEE/ACM Transactions on Networking, vol. 4, No. 1, Feb. 1996, pp. 86–97.

Williams, K. A., "A Distributed ATM Network Based on an Optical Passive Star", printed from website http://williams.cs.ncat.edu/ATMStar.htm, 2 pages, (1998).

"All–optical ATM–Switch based on Self Electro–optic Effect Devices (SEED's)", printed from website http://www.stw.nl/projecten/T/tel3997.html, 2 pages, Feb. 2, 1997.

* cited by examiner

*Primary Examiner*—David R. Vincent
(74) *Attorney, Agent, or Firm*—Howard Zaretsky; David J. Weitz; Wilson Sonini Goodrich & Rosati (57) ABSTRACT

A caching method to greatly reduce the time to calculate routes based on the well known Dijkstra routing algorithm. A first embodiment is suitable for use in applications where only a single class of call is in use. A second embodiment is suitable for use where multiple classes of calls are is simultaneous use. A sequential number field and a global variable holding a sequential count are maintained by each node. When a node is put on the PATH list, the global sequential count variable is copied to the sequential number field for that particular node descriptor. Subsequently, when a route to destination node is to be calculated, for each node marked as a destination, the global sequential count variable and the node descriptor sequential number field are checked if they are equal. If they are, it means that a route has already been calculated to the destination which was already determined to be optimum.

14 Claims, 7 Drawing Sheets

METHOD OF CACHING ROUTES IN ASYNCHRONOUS TRANSFER MODE PNNI NETWORKS

FIELD OF THE INVENTION

The present invention relates generally to data communication networks and more particularly relates to a method of routing utilizing caching in Private Network to Network Interface (PNNI) based networks.

BACKGROUND OF THE INVENTION

Currently, there is a growing trend to make Asynchronous Transfer Mode (ATM) networking technology the base of future global communications. ATM has already been adopted as a standard for broadband communications by the International Telecommunications Union (ITU) and by the ATM Forum, a networking industry consortium.

Asynchronous Transfer Mode

ATM originated as a telecommunication concept defined by the Comite Consulatif International Telegraphique et Telephonique (CCITT), now known as the ITU, and the American National Standards Institute (ANSI) for carrying user traffic on any User to Network Interface (UNI) and to facilitate multimedia networking between high speed devices at multi-megabit data rates. ATM is a method for transferring network traffic, including voice, video and data, at high speed. Using this connection oriented switched networking technology centered around a switch, a great number of virtual connections can be supported by multiple applications through the same physical connection. The switching technology enables bandwidth to be dedicated for each application, overcoming the problems that exist in a shared media networking technology, like Ethernet, Token Ring and Fiber Distributed Data Interface (FDDI). ATM allows different types of physical layer technology to share the same higher layer—the ATM layer.

More information on ATM networks can be found in the book "ATM: The New Paradigm for Internet, Intranet and Residential Broadband Services and Applications," Timothy Kwok, Prentice Hall, 1998.

ATM uses very short, fixed length packets called cells. The first five bytes, called the header, of each cell contain the information necessary to deliver the cell to its destination. The cell header also provides the network with the ability to implement congestion control and traffic management mechanisms. The fixed length cells offer smaller and more predictable switching delays as cell switching is less complex than variable length packet switching and can be accomplished in hardware for many cells in parallel. The cell format also allows for multi-protocol transmissions. Since ATM is protocol transparent, the various protocols can be transported at the same time. With ATM, phone, fax, video, data and other information can be transported simultaneously.

ATM is a connection oriented transport service. To access the ATM network, a station requests a virtual circuit between itself and other end stations, using the signaling protocol to the ATM switch. ATM provides the User Network Interface (UNI) which is typically used to interconnect an ATM user with an ATM switch that is managed as part of the same network.

The current standard solution for routing in a private ATM network is described in Private Network Node Interface (PNNI) Phase 0 and Phase 1 specifications published by ATM Forum. The previous Phase 0 draft specification is referred to as Interim Inter-Switch Signaling Protocol (IISP). The goal of the PNNI specifications is to provide customers of ATM network equipment some level of multi-vendor interoperability.

PNNI Phase 1

As part of the ongoing enhancement to the ATM standard by work within the ATM Forum and other groups, the Private Network to Network Interface (PNNI) protocol Phase 1 has been developed for use between private ATM switches and between groups of private ATM switches. The PNNI specification includes two categories of protocols. The first protocol is defined for the distribution of topology information between switches and clusters of switches where the information is used to compute routing paths within the network. The main feature of the PNNI hierarchy mechanism is its ability to automatically configure itself within the networks in which the address structure reflects the topology. The PNNI topology and routing techniques are based on the well known link state routing technique.

The second protocol is effective for signaling, i.e., the message flows used to establish point-to-point and point-to-multipoint connections across the ATM network. This protocol is based on the ATM Forum User to Network Interface (UNI) signaling with mechanisms added to support source routing, crankback and alternate routing of source SETUP requests in the case of bad connections.

With reference to the PNNI Phase 1 specifications, the PNNI hierarchy begins at the lowest level where the lowest level nodes are organized into peer groups. A logical node in the context of the lowest hierarchy level is the lowest level node. A logical node is typically denoted as simply a node. A peer group is a collection of logical nodes wherein each node within the group exchanges information with the other members of the group such that all members maintain an identical view of the group. When a logical length becomes operational, the nodes attached to it initiate and exchange information via a well known Virtual Channel Connection (VCC) used as a PNNI Routing Control Channel (RCC).

Hello messages are sent periodically by each node on this link. In this fashion, the Hello protocol makes the two neighboring nodes known to each other. Each node exchanges Hello packets with its immediate neighbors to determine its neighbor's local state information. The state information includes the identity and peer group membership of the node's immediate neighbors and the status of its links to its neighbors. Each node then bundles its state information in one or more PNNI Topology State Elements (PTSEs) which are subsequently flooded throughout the peer group.

PTSEs are the smallest collection of PNNI routing information that are flooded as a unit among all logical nodes within a peer group. A node topology database consists of a collection of all PTSEs received, which represent that particular node's present view of the PNNI routing topology. In particular, the topology database provides all the information required to compute a route from the given source node to any destination address reachable in or through that routing domain.

When neighboring nodes at either end of a logical length begin initializing through the exchange of Hellos, they may conclude that they are in the same peer group. If it is concluded that they are in the same peer group, they proceed to synchronize their topology databases. Database synchronization includes the exchange of information between neighboring nodes resulting in the two nodes having identical topology databases. A topology database includes detailed topology information about the peer group in which the logical node resides in addition to more abstract topology information representing the remainder of the PNNI routing domain.

During a topology database synchronization, the nodes in question first exchange PTSE header information, i.e., they advertise the presence of PTSEs in their respective topology databases. When a node receives PTSE header information that advertises a more recent PTSE version than the one that it has already or advertises a PTSE that it does not yet have, it requests the advertised PTSE and updates its topology database with the subsequently received PTSE. If the newly initialized node connects to a peer group then the ensuing database synchronization reduces to a one way topology database copy. A link is advertised by a PTSE transmission only after the database synchronization between the respective neighboring nodes has successfully completed. In this fashion, the link state parameters are distributed to all topology databases in the peer group.

Flooding is the mechanism used for advertising links whereby PTSEs are reliably propagated node by node throughout a peer group. Flooding ensures that all nodes in a peer group maintain identical topology databases. A short description of the flooding procedure follows. PTSEs are encapsulated within PNNI Topology State Packets (PTSPs) for transmission. When a PTSP is received its component PTSEs are examined. Each PTSE is acknowledged by encapsulating information from its PTSE header within the acknowledgment packet which is sent back to the sending neighbor. If the PTSE is new or of more recent origin then the node's current copy, the PTSE is installed in the topology database and flooded to all neighboring nodes except the one from which the PTSE was received. A PTSE sent to a neighbor is periodically retransmitted until acknowledged.

Note that flooding is an ongoing activity wherein each node issues PTSPs with PTSEs that contain updated information. The PTSEs contain the topology databases and are subject to aging and get removed after a predefined duration if they are not refreshed by a new incoming PTSE. Only the node that originally originated a particular PTSE can re-originate that PTSE. PTSEs are reissued both periodically and on an event driven basis.

A major feature of the PNNI specification is the routing algorithm used to determine a path for a call from a source user to a destination user. The routing algorithm of PNNI is a type of link state routing algorithm whereby each node is responsible for meeting its neighbors and learning their identities. Nodes learn about each other via the flooding of PTSEs described hereinabove. Each node computes routes to each destination user using the information received via the PTSEs to form a topology database representing a view of the network.

Using the Hello protocol and related FSM of PNNI, neighboring nodes learn about each other by transmitting a special Hello message over the link. This is done on a continual periodic basis. When a node generates a new PTSE, the PTSE is flooded to the other nodes within its peer group. This permits each node to maintain an up to date view of the network. Additional information on link state routing can be found in Section 9.2 of the book Interconnections: Bridges and Routers by Radia Perlman, Addison-Wesley, 1992, incorporated herein by reference.

Once the topology of the network is learned by all the nodes in the network, routes can be calculated from source to destination users. A routing algorithm that is commonly used to determine the optimum route from a source node to a destination node is the Dijkstra algorithm.

To aid in the understanding of the principles of the present invention, a description of the well known prior art Dijkstra routing algorithm is presented. More detailed information on the Dijkstra algorithm can be found in Section 9.2.4 of the book Interconnections: Bridges and Routers by Radia Perlman, Addison-Wesley, 1992, incorporated herein by reference.

In general, the Dijkstra algorithm is used to generate the Designated Transit List which is the routing list used by each node in the path during the setup phase of the call. Used in the algorithm are the topology database (link state database) which includes the PTSEs received from each node, a Path List comprising a list of nodes for which the best path from the source node has been found and a Tentative List comprising a list of nodes that are only possibly the best paths. Once it is determined that a path is in fact the best possible, the node is moved from the Tentative List to the Path List.

Figure 1:
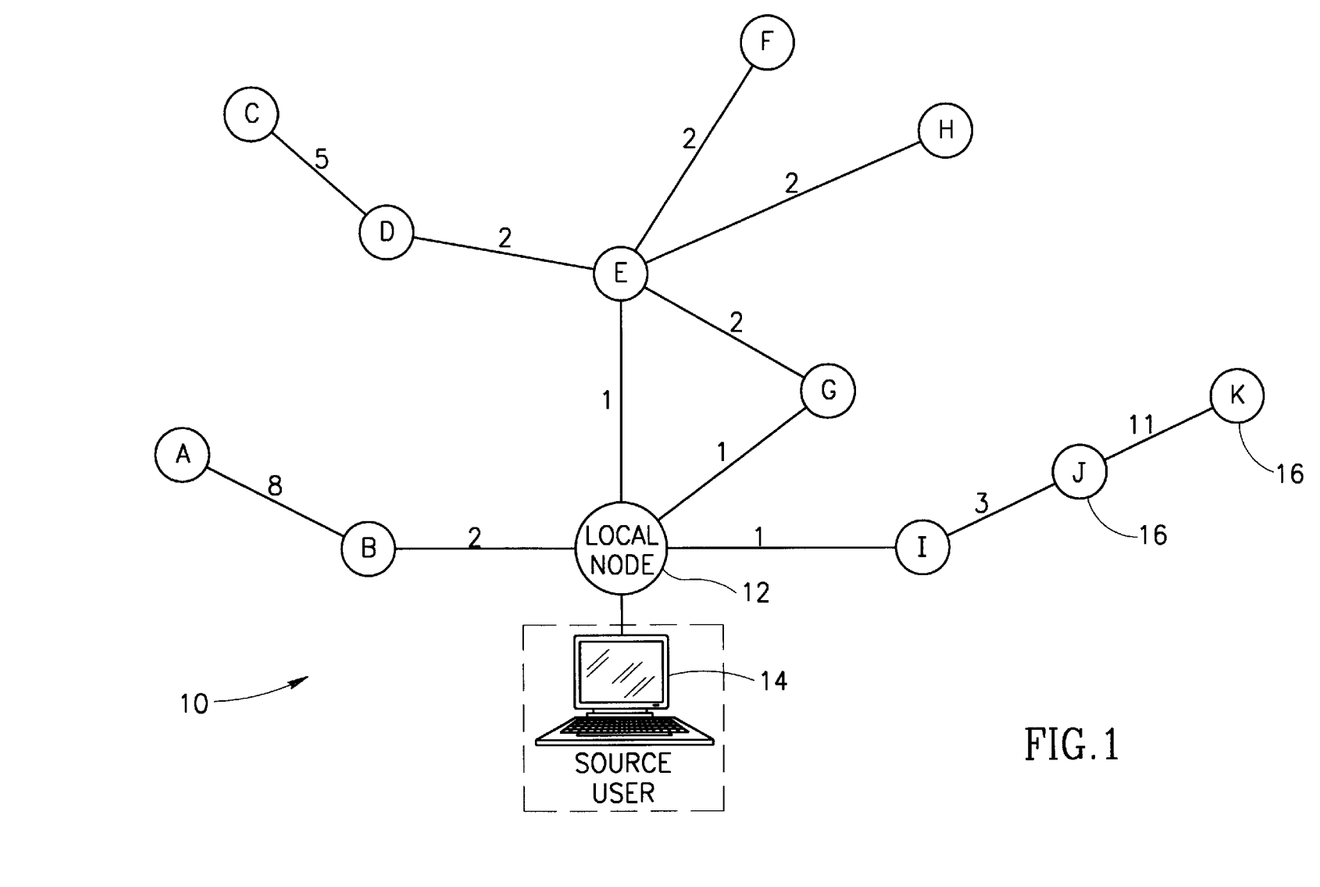
FIG. 1 is a diagram illustrating an example ATM network consisting of a plurality of nodes and a source user connected to a local node.

The description will be presented in the context of an example network for illustration purposes. A diagram illustrating an example ATM network consisting of a plurality of nodes and a source user connected to a local node is shown in FIG. 1. The example network, generally referenced 10, comprises a plurality of nodes 16, each labeled by a different letter. A source user 14 is connected to a local node 12. Nodes are connected via links between them with the link cost represented by a number shown next to each link. Note that the cost of a link's corresponds to the links resources, e.g., its capacity. Links with lower costs are preferred over links with higher costs. For purposes of the example presented below, node A is considered the destination node.

The algorithm begins with the source node (self) as the root of a tree by placing the source node ID onto the Path List. Next, for each node N placed in the Path List, examine N's nearest neighbors. For each neighbor M, add the cost of the path from the root to N to the cost of the link from N to M. If M is not already in the Path List or the Tentative List with a better path cost, add M to the Tentative List.

If the Tentative List is empty, the algorithm terminates. Otherwise, the entry in the Tentative List with the minimum cost is found. That entry is moved to the Path List and the examination step described above is repeated.

Figure 2:
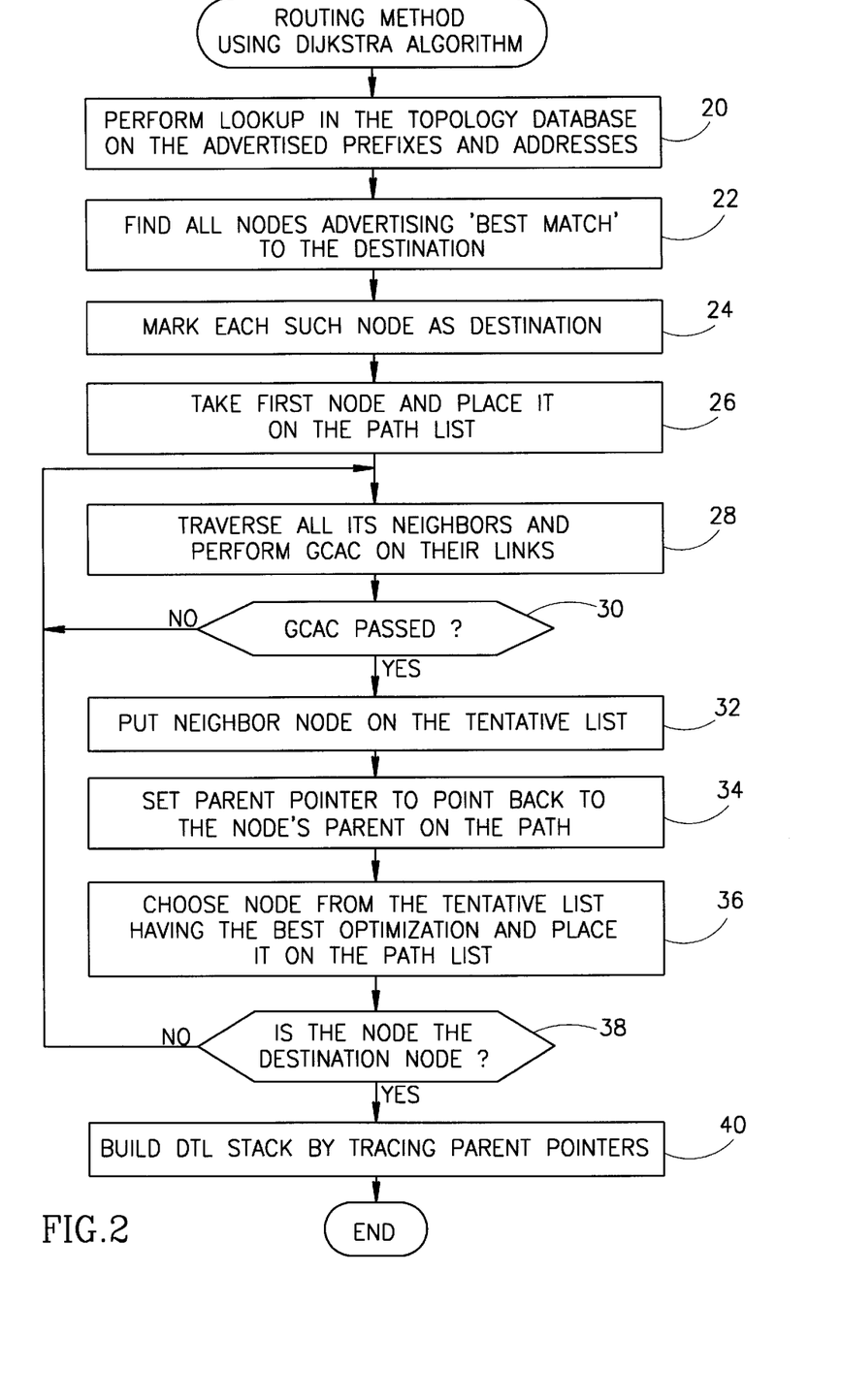
FIG. 2 is a flow diagram illustrating the prior art method of network routing using the well known Dijkstra method.

A flow diagram illustrating the prior art method of network routing using the well known Dijkstra method is shown in FIG. 2. The first step is to perform an address lookup (step 20) in the node's topology database on the advertised reachable prefixes and addresses to find all the nodes that advertise a 'BEST MATCH' to the destination node (step 22). Each of the nodes found in the search are marked as a 'destination' for this particular route calculation (step 24). Note that more than one node can be marked as a destination node.

The calculations begin with the first node, i.e., the local node, which is placed on the PATH list (step 26). All the neighbors of the local node are then traversed wherein a number of metrics are accumulated for each neighbor (step 28). With reference to FIG. 1, the neighbors include nodes B, E, G and I. A Generic Connection Admission Control (GCAC) analysis is performed on the links to the neighbors and if a link passes the GCAC analysis (step 30), the corresponding neighbor is placed on the TENTATIVE tree which is keyed for metric optimization (step 32). In this case, four links corresponding to nodes B, E, G and I are placed on the TENTATIVE list. The parent pointer is then set to point back to the neighbor's parent node along the path, i.e., the node whose links were just evaluated (step 34).

The TENTATIVE list is then sorted by the accumulated link cost as shown below in Table 1.

TABLE 1

| Node | Accumulated Cost |
| --- | --- |
| E | 1 |
| G | 1 |
| I | 1 |
| B | 2 |

A node is then chosen from the TENTATIVE list having the best optimization among all the nodes on the TENTATIVE list and placed on the PATH list (step 36). It is then checked to see if the node chosen is marked as the destination node (step 38).

If the node is marked as the destination node, a routing list known as a Designation Transit List (DTL) stack, is generated by tracing the parent pointers from the destination node back to the local node (step 40). If the node is not the destination node the method returns to step 28 and the node's neighbors are traversed.

Figure 3:
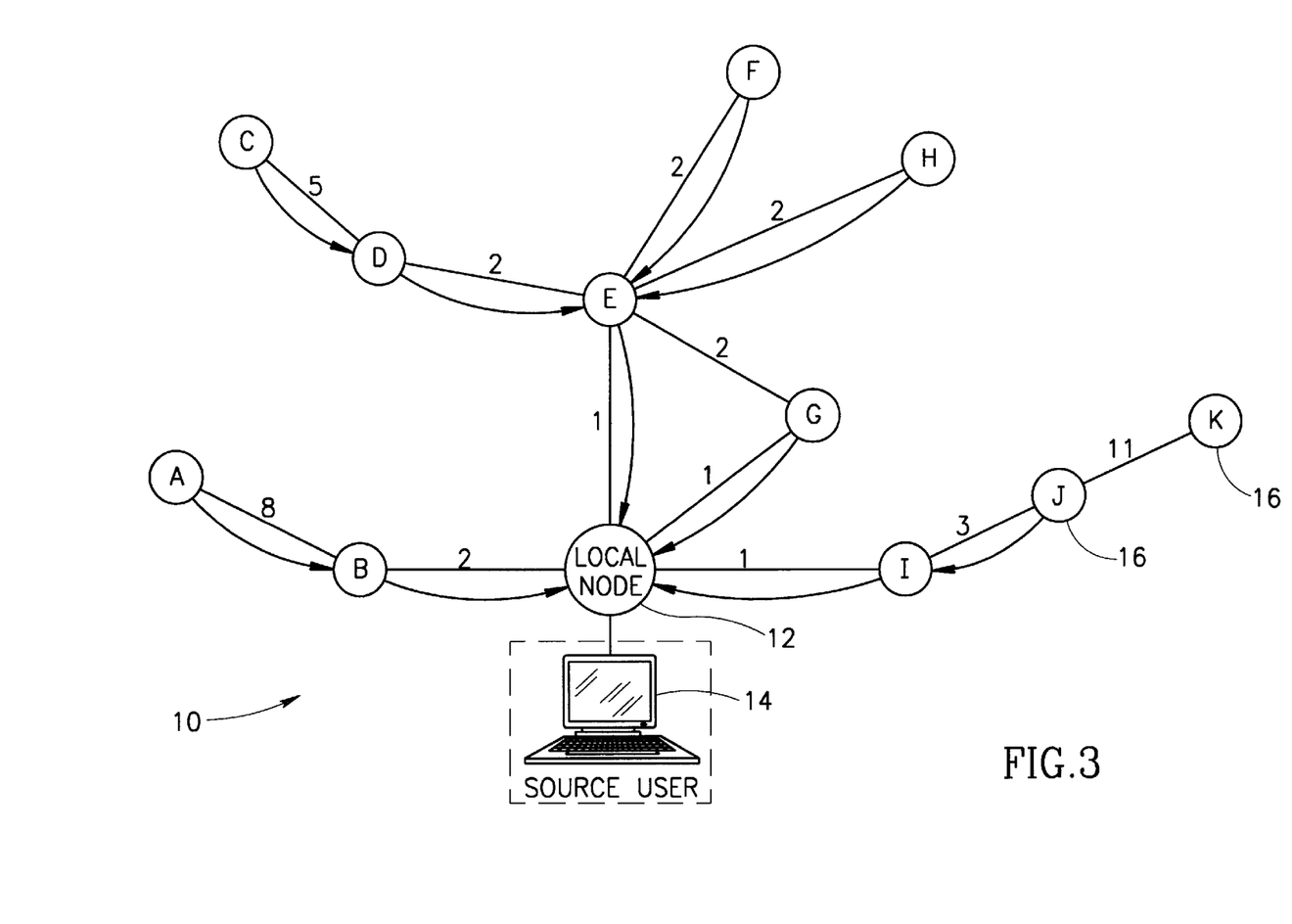
FIG. 3 is a diagram illustrating the example ATM network of FIG. 1 with parent pointers indicated connecting nodes back to the local node.

A diagram illustrating the example ATM network of FIG. 1 with parent pointers indicated connecting nodes back to the local node is shown in FIG. 3. Each node is shown with an arrow pointing back to its parent node along the path. For example, assume that node E was randomly selected (note that the cost of nodes E, G, I are identical). Since node E is not the destination, the neighbors of node E are then examined, i.e., nodes D, F, H and G. The accumulated cost back to the local node of each link is then examined. Links having lower cost are selected over those having higher costs. The TENTATIVE list is shown in Table 2 below.

TABLE 2

| Node | Accumulated Cost |
| --- | --- |
| B | 2 |
| D | 3 |
| F | 3 |
| H | 3 |
| G | 1 |
| I | 1 |

The process continues in this fashion until almost the entire network is traversed as shown in FIG. 3. Ultimately, the destination node A is found and the DTL stack consisting of (local node, B, A) is generated.

Note that there may be more than one path to a destination node. In this case, the algorithm builds a plurality of DTL stacks, with a final decision being made after almost all the nodes are traversed. The optimum DTL stack is then chosen after all possible paths to the destination have been uncovered and examined. In this fashion every node in the network and its corresponding links is examined until the optimum path is found.

The routing algorithm described above must be performed in response to a SETUP request from a user. The attached node must perform the route calculations each time, regardless of the destination address. Running a routing algorithm, such as Dijkstra, however, consumes computing resources in terms of memory and processor time. As was seen in the example above, almost the entire network was traversed to generate the DTL stack to the destination node A. If a the routes could be cached, the route calculation time and the resource utilization would be greatly reduced.

One approach to implementing caching is to store a separate DTL stack for each possible destination. This would require an enormous amount of memory and is very wasteful if some destinations are never requested. Alternatively, a separate DTL stack can be saved only for destinations that are actually requested by a user. This too, however requires a large amount of memory which is a limited resource and is already scarce, especially in older generation switches being upgraded to run the current PNNI specifications.

In addition, whenever there is a change in the topology of the network, all the cached routes must be erased, i.e., the cache must be flushed. This is because the previously calculated routes would not reflect the changes in the network topology. Links and nodes may have been added, deleted or changed that make the previously calculated routes obsolete. This requires the cache to be quickly flushed whenever the network topology changes. This by itself can be time consuming and wasteful of processor resources, especially if a new route need to be recalculated. Thus, this caching scheme is not suitable for use in PNNI networks.

SUMMARY OF THE INVENTION

The present invention is a caching method used to greatly reduce the time to calculate routes. The caching method is based on the well known Dijkstra routing algorithm. Two embodiments of the caching method are presented. The first embodiment is suitable for use in applications where only a single class of call is in use. The second embodiment is suitable for use where multiple classes of calls are in simultaneous use.

The method adds a new field to the node descriptor called a sequential number field. A new global variable holding a sequential count and which is seen by all nodes is also added. The key to the method is that during the execution of the Dijkstra algorithm, when a node is put on the PATH list, the global sequential count variable is copied to the sequential number field for that particular node descriptor. Subsequently, when a route to a destination node is to be calculated, for each node marked as a destination, the global sequential count variable and the node descriptor sequential number field are checked if they are equal. If they are, it means that a route has already been calculated to the destination which was already determined to be optimum. The route was already considered optimum since it was previously placed on the PATH list. Recall that only optimum nodes having an optimized cost are moved from the TENTATIVE list to the PATH list. Since the route has already been worked out, the DTL stack can be easily constructed by tracing the parent pointers back to the local node.

A major advantage of the caching method of the present invention is that if the values for the sequential number and count variables are represented as 32 bit integers, the additional memory required to implement the caching method of the first embodiment is 4 bytes for each node. Only 4 extra bytes are needed since the parent pointer is used by the Dijkstra algorithm in any case. The additional memory required to implement the caching method of the second embodiment is 8 bytes for each node per class of call supported. This is in direct contrast to the prior art caching solutions which require relatively large amounts of memory to implement.

There is therefore provided in accordance with the present invention, in a network based on the Private Network to Network Interface (PNNI) standard and consisting of a plurality of nodes, a method of caching routes generated using the Dijkstra algorithm into a cache maintained on each node, the Dijkstra algorithm utilizing a PATH list in the calculation of routes, the method supporting a single class of call, the method comprising the steps of maintaining a cache sequence number on each node, maintaining a global cache sequence count on each node, setting the cache sequence number equal to the cache sequence count when the node is placed onto the PATH list and constructing a routing list directly from parent pointers, defining a route from a destination node to a local node, if the cache sequence number equals the cache sequence count.

The method further comprises the step of clearing the cache, comprising the steps of incrementing the global cache sequence count, setting the global cache sequence count to one when it reaches its maximum count and setting the cache sequence number on each node to zero when the global cache sequence reaches its maximum count. The method further comprises the steps of initializing the cache sequence number in each node to zero and initializing the global cache sequence count to one.

There is also provided in accordance with the present invention, in a network based on the Private Network to Network Interface (PNNI) standard and consisting of a plurality of nodes, a method of caching routes generated using the Dijkstra algorithm into a plurality of caches maintained on each node, each cache supporting a different class of call, the Dijkstra algorithm utilizing a PATH list in the calculation of routes, the method comprising the steps of maintaining N sets of variables consisting of a cache sequence number, a parent pointer and a global cache sequence count for each node wherein each set of variables is associated with a single class of call to be supported, setting the cache sequence number, within a particular set of variables corresponding to a particular class of call, equal to the cache sequence count when the node is placed onto the PATH list and constructing a routing list directly from parent pointers, defining a route from a destination node to a local node, if the cache sequence number, within a particular set of variables corresponding to a particular class of call, equals the cache sequence count within the set of variables thereof.

The method further comprises the step of clearing the plurality of caches. Further, the step of clearing the cache comprises the step of incrementing the global cache sequence counts within all N sets of variables. The method further comprises the step of selectively clearing one of the plurality of caches associated with a particular class of call.

Also, the step of clearing the cache comprises the step of selectively clearing the cache for a particular class of call by incrementing the global cache sequence count associated with the set of variables for that particular class of call.

The method further comprises the step of clearing each of the plurality of caches, comprising the steps of incrementing the global cache sequence count within the set of variables associated with each class of call, setting the global cache sequence count within the set of variables associated with each class of call to one when it reaches its maximum count and setting the cache sequence number within the set of variables associated with each class of call on each node to zero when the global cache sequence reaches its maximum count.

The method further comprises the step of clearing one of the plurality of caches, comprising the steps of incrementing the global cache sequence count associated with one selected class of call, setting the global cache sequence count associated with one selected class of call to one when it reaches its maximum count and setting the cache sequence number associated with one selected class of call on each node to zero when the global cache sequence reaches its maximum count.

The method further comprises the steps of initializing the cache sequence number associated with one class of call in each node to zero and initializing the global cache sequence count associated with one class of call to one.

The method further comprises the steps of initializing the cache sequence number associated with all classes of calls in each node to zero and initializing the global cache sequence count associated with all classes of calls to one.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

The following notation is used throughout this document.

| Term | Definition |
| --- | --- |
| ABR | Absolute Bit Rate |
| ANSI | American National Standards Institute |
| ATM | Asynchronous Transfer Mode |
| CBR | Constant Bit Rate |
| CCITT | Comite Consulatif International Telegraphique et Telephonique |
| DTL | Designate Transmit List |
| FDDI | Fiber Distributed Data Interface |
| FSM | Finite State Machine |
| GCAC | Generic Connection Admission Control |
| IISP | Interim Inter-Switch Signaling Protocol |
| ITU | International Telecommunications Union |

-continued

| Term | Definition |
|---|---|
| PNNI | Private Network to Network Interface |
| PTSE | PNNI Topology State Element |
| PTSP | PNNI Topology State Packet |
| RCC | Routing Control Channel |
| UBR | Unspecified Bit Rate |
| UNI | User to Network Interface |
| VCC | Virtual Channel Connection |

General Description

The present invention is a caching method used to greatly reduce the time to calculate routes. The caching method is based on the well known Dijkstra routing algorithm. Two embodiments of the caching method are presented. The first embodiment is suitable for use in applications where only a single class of call is in use. The second embodiment is suitable for use where multiple classes of calls are is simultaneous use.

Figure 4:
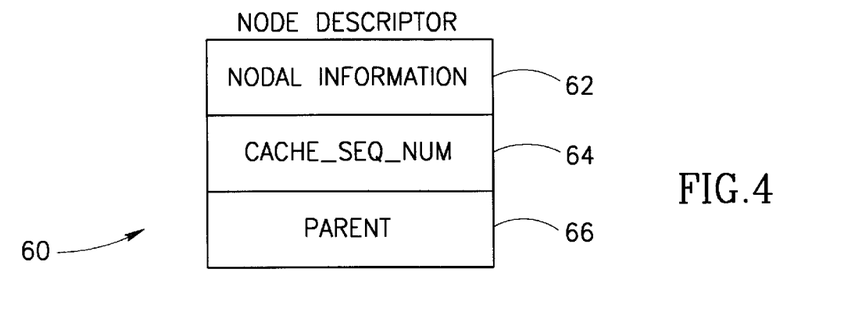
FIG. 4 is a diagram illustrating the structure of a node descriptor.

The method adds a new field to the node descriptor, which is shown in FIG. 4. The node descriptor 60 comprises various conventional nodal information 62, a sequential number variable called CACHE_SEQ_NUM 64 and a pointer 66 to the nodes parent along the path.

Figure 5:
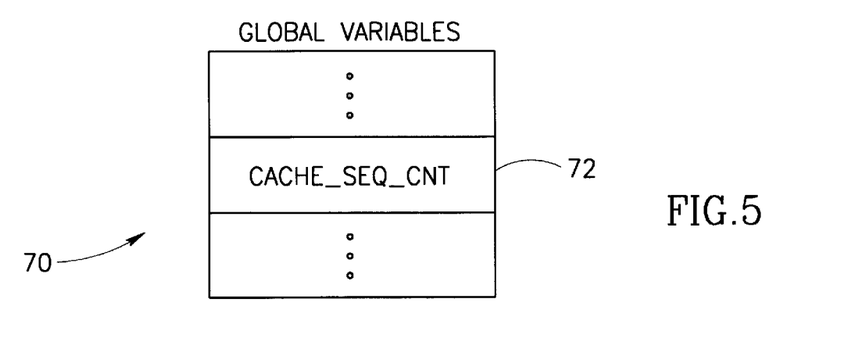
FIG. 5 is a diagram illustrating a portion of the global variable structure.

In addition, a new global variable is maintained as shown in FIG. 5. A new sequential count global variable 72 known as CACHE_SEQ_CNT is stored in the global variable area 70 of memory. The global variables are seen by all the nodes in the network.

Figure 6:
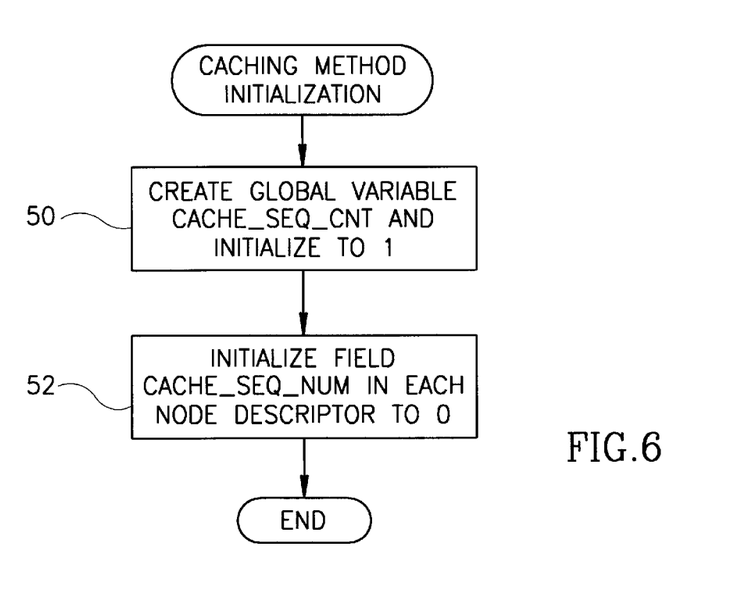
FIG. 6 is a flow diagram illustrating the initialization portion of the caching method of the present invention.

A flow diagram illustrating the initialization portion of the caching method of the present invention is shown in FIG. 6. The global variable CACHE_SEQ_CNT is created and initialized to one (step 50). Next, the field CACHE_SEQ_NUM in each node is initialized to zero (step 52). The field CACHE_SEQ_NUM is initialized to zero whenever a node descriptor is initialized.

The key to the method is that during the execution of the Dijkstra algorithm, when a node is put on the PATH list, the global variable CACHE_SEQ_CNT is copied to the field CACHE_SEQ_NUM for that particular node descriptor. Subsequently, when a route to destination node is to be calculated, for each node marked as a destination, the global variable CACHE_SEQ_CNT and the node descriptor field CACHE_SEQ_NUM are checked if they are equal. If they are, it means that a route has already been calculated to the destination which was already determined to be optimum. The route was already considered optimum since it was previously placed on the PATH list. Recall that only optimum nodes having an optimized cost are moved from the TENTATIVE list to the PATH list. Since the route has already been worked out, the DTL stack can be easily constructed by tracing the parent pointers back to the local node.

Figure 7:
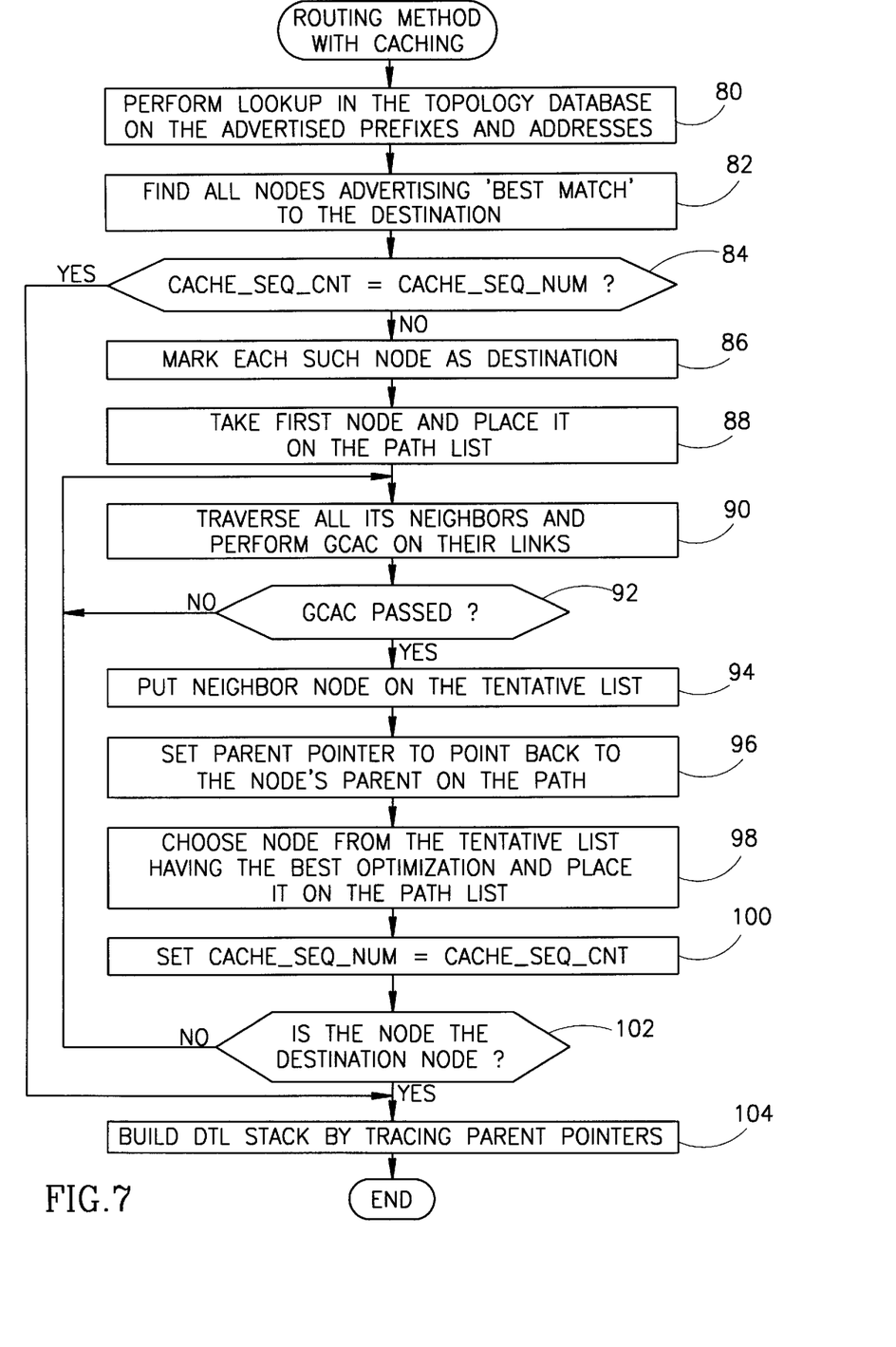
FIG. 7 is a flow diagram illustrating the routing method of the present invention utilizing caching.

A flow diagram illustrating the routing method of the present invention utilizing caching is shown in FIG. 7. This method is similar to that shown in FIG. 2 with the additional steps added to implement the caching method of the present invention. The steps of Dijkstra are repeated, however, for completeness. The first step is to perform an address lookup (step 80) in the node's topology database on the advertised reachable prefixes and addresses to find all the nodes that advertise a 'BEST MATCH' to the destination node (step 82).

The global variable CACHE_SEQ_CNT and the node descriptor field CACHE_SEQ_NUM are then checked if they are equal (step 84). If they are, it means that a route has already been calculated to the destination which was already determined to be optimum. The route was already considered optimum since it was previously placed on the PATH list. Since the route has already been worked out, the DTL stack can then be constructed by tracing the parent pointers back to the local node (step 104). The routing calculation is then finished.

If the global variable CACHE_SEQ_CNT and the node descriptor field CACHE_SEQ_NUM are not equal then the method proceeds as follows. Each of the nodes found in the search are marked as a 'destination' for this particular route calculation (step 86). Note that more than one node can be marked as a destination node.

The first node, i.e., the local node, is placed on the PATH list (step 88). All the neighbors of the local node are then traversed wherein a number of metrics are accumulated for each neighbor (step 90). A GCAC analysis is performed on the links to the neighbors and if a link passes the GCAC analysis (step 92), the corresponding neighbor is placed on the TENTATIVE tree (step 94). The GCAC is used to determine whether the links support the features, i.e., bit rate, flow control, etc., as requested by the user.

Next, the parent pointer is then set to point back to the neighbor's parent node along the path, i.e., the node whose links were just evaluated (step 96). The TENTATIVE list is then sorted by the accumulated link cost. A node is then chosen from the TENTATIVE list having the best optimization among all the nodes on the TENTATIVE list and placed on the PATH list (step 98).

The field CACHE_SEQ_NUM in the node descriptor of the selected neighbor node is set equal to the value of the global variable CACHE_SEQ_CNT (step 100). The global variable CACHE_SEQ_CNT is used as an indication of whether the previously calculated route is current. If the two numbers do not match up, it means that that particular route is not current and should not be used to generate the DTL stack. Thus, this step serves to indicate that this particular node was selected as an optimum node along one of the paths traversed by the Dijkstra algorithm. This indication, is used in subsequent route setup requests to bypass the entire Dijkstra route calculation algorithm which would otherwise consume valuable time and processor resources. If the field CACHE_SEQ_NUM is found equal to the CACHE_SEQ_CNT, it means that the path from the local node to that particular node was traversed and found to be optimum. Thus, the DTL stack, which can be generated by tracing the parent return pointers, is also optimum.

It is then checked to see if the node chosen is marked as the destination node (step 102). If the node is marked as the destination node, the DTL stack is generated by tracing the parent pointers from the destination node back to the local node (step 104). If the node is not the destination node the method returns to step 90 and the step of traversing the node's neighbors is repeated.

Figure 8:
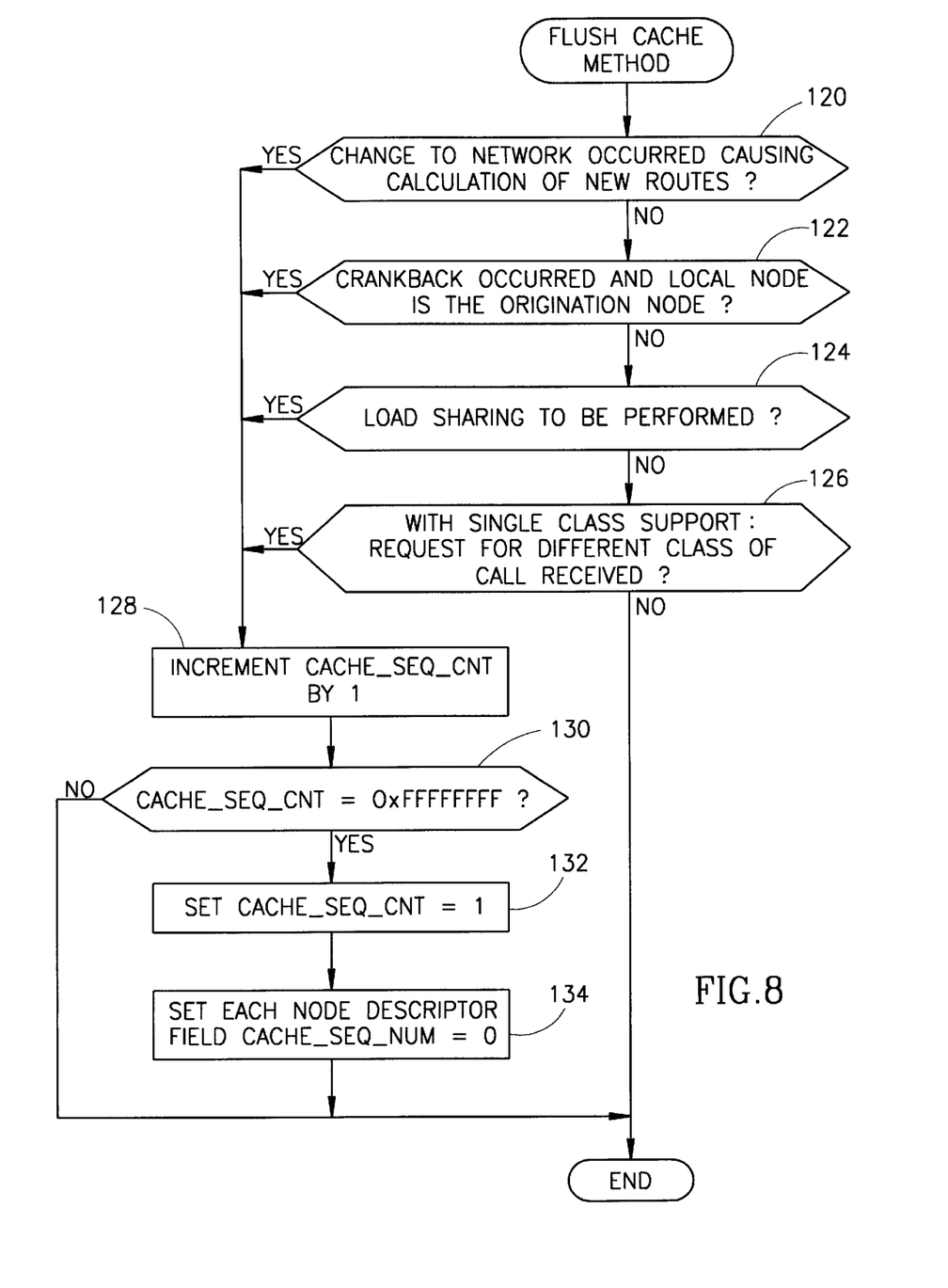
FIG. 8 is a flow diagram illustrating the method of flushing the cache.

The method of flushing the cache will now be described in more detail. A flow diagram illustrating the method of flushing the cache is shown in FIG. 8. There are various events in the normal course of operation of a network that would require the cache to be flushed. These are discussed below in connection with FIG. 8.

Any of the following events would require the cache to be flushed. If a change occurs to the network topology that would cause the calculation of new routes to occur (step 120). A crankback occurred wherein the local node is the ORIGINATION node (step 122). This can be determined when a crankback element is detected in a RELEASE or ADD PARTY REJECT message received by a node. The cache must also be flushed in order to permit load sharing between similar routes (step 124). Note that the load sharing performed in this case is random between the routes. The cache can be flushed either (1) after the expiration of a load sharing timer that is periodically initialized or (2) after exceeding a threshold of route calculation requests. This option can be made programmable and setable by a user. Also, with the first embodiment, the cache must be flushed whenever a request arrives for a call of a different class that was used previously (126).

Optionally, the cache can also be flushed after an ADD PARTY message is processed in a point to multipoint call. The ADD PARTY operation puts the existing point to multipoint tree in the PATH list regardless of whether it is optimal or not. In this case, the Dijkstra algorithm is performed only on nodes that are on the actual path of the call.

The cache is flushed simply by incrementing the global variable CACHE_SEQ_CNT by one (step 128). This serves to invalidate every route already calculated, since the global variable CACHE_SEQ_CNT and the field CACHE_SEQ_NUM are not equal anymore. This forces each new call request to calculate a route anew. Thus, the cache is flushed in substantially zero CPU time.

It is then checked whether the value of the global variable CACHE_SEQ_CNT is equal to its maximum value of 0xFFFFFFFF (step 130). This assumes that the size of CACHE_SEQ_CNT is 32 bits. Note that the size of the variable does not limit the scope of the method. It is preferable, however, to use longer lengths for the following reason. Since the global variable is incremented every time the cache is flushed, it potentially can reach its maximum and would otherwise roll over back to zero and continue incrementing upwards. If this were to happen, seldom used routes that were calculated a relatively long time ago and long since flushed from the cache may become valid.

For example, there may exist one or more nodes that still have zero in their CACHE_SEQ_NUM fields from the time they were initialized, i.e., from the start of operation of the network, that were never placed on the PATH list. A problem exists when one of these nodes becomes the destination node while its sequence number CACHE_SEQ_NUM is still zero from initialization. When the global variable CACHE_SEQ_CNT rolls over to zero, all these nodes suddenly become valid cache hits.

To avoid this problem, when CACHE_SEQ_CNT reached its maximum, it is reset to one (step 132) and, in addition, each node descriptor field CACHE_SEQ_NUM is set equal to zero (step 134).

The second embodiment of the present invention is suitable or use in applications that require simultaneous use of multiple classes of calls, e.g., UBR, CBR, ABR, set. In this case, multiple sets of fields CACHE_SEQ_NUM and variables CACHE_SEQ_CNT are maintained for each class of call.

Figure 9:
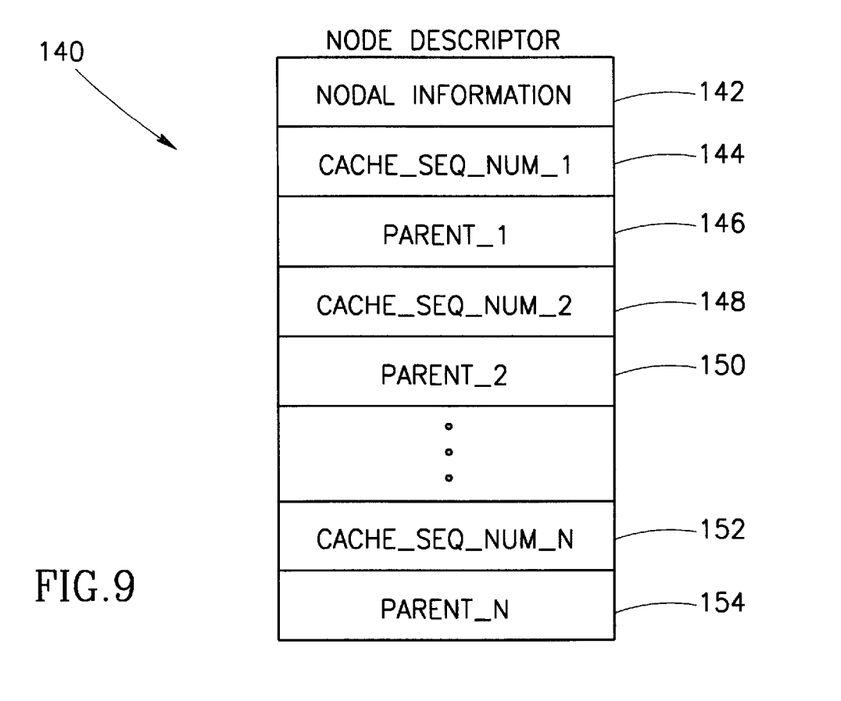
FIG. 9 is a diagram illustrating the structure of a node descriptor when the method is used in an application with multiple call types.

A diagram illustrating the structure of a node descriptor when the method is used in an application with multiple call types is shown in FIG. 9. The node descriptor 140 shown here is suitable for any number N classes of calls. The node descriptor comprises various nodal information 142, a CACHE_SEQ_NUM_1 144 field and parent pointer PARENT_1 146 associated with a first class of call. Similarly, a CACHE_SEQ_NUM_2 148 field and parent pointer PARENT_2 150 are associated with a second class of call. Additional fields up to CACHE SEQ_NUM_N 152 and parent pointer PARENT_N 154 are associated with the $N^{th}$ class of call.

Figure 10:
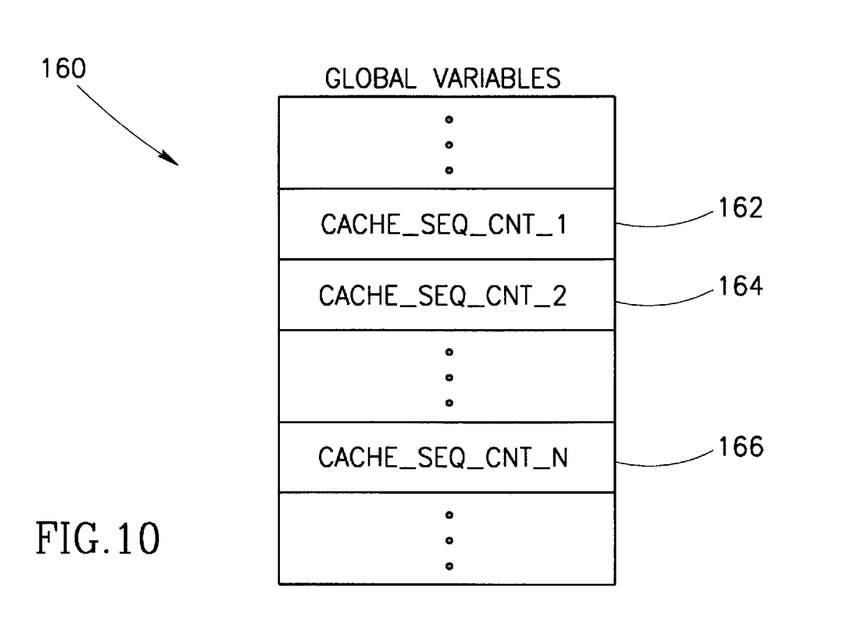
FIG. 10 is a diagram illustrating a portion of the global variable structure when the method is used in an application with multiple call types.

A diagram illustrating a portion of the global variable structure when the method is used in an application with multiple call types is shown in FIG. 10. In similar fashion to the node descriptor, a separate global variable is maintained for each class of call. The global variable list 160 comprises variables CACHE_SEQ_CNT_1 162, CACHE_SEQ_CNT_2 164 through CACHE_SEQ_CNT_N 166 thus supporting N classes of call.

The structures of FIGS. 9 and 10 permit the caching method of the present invention to be performed on different classes of calls simultaneously. Each call class maintains its own set of cache hits. All the caches for all call classes can be flushed simultaneously or they can be flushed on a call class by call class basis.

Note that if the values for the CACHE_SEQ_NUM and CACHE_SEQ_CNT values are represented as 32 bit integers, the additional memory required to implement the caching method of the first embodiment is 4 bytes for each node. Only 4 extra bytes are needed since the parent pointer is used by the Dijkstra algorithm in any case. The additional memory required to implement the caching method of the second embodiment is 8 bytes for each node per class of call supported.

While the invention has been described with respect to a limited number of embodiments, it will be appreciated that many variations, modifications and other applications of the invention may be made.

What is claimed is:

1. In a network based on the Private Network to Network Interface (PNNI) standard and consisting of a plurality of nodes, a method of caching routes generated using the Dijkstra algorithm into a cache maintained on each node, said Dijkstra algorithm utilizing a PATH list in the calculation of routes, said method supporting a single class of call, said method comprising the steps of:

maintaining a cache sequence number on each node;

maintaining a global cache sequence count on each node;

setting said cache sequence number equal to said cache sequence count when the node is placed onto said PATH list; and constructing a routing list directly from parent pointers, defining a route from a destination node to a local node, if said cache sequence number equals said cache sequence count.

2. The method according to claim 1, further comprising the step of clearing said cache.

3. The method according to claim 2, wherein the step of clearing said cache comprises the step of incrementing said global cache sequence count.

4. The method according to claim 1, further comprising the step of clearing said cache, comprising the steps of:

incrementing said global cache sequence count;

setting said global cache sequence count to one when it reaches its maximum count; and setting said cache sequence number on each node to zero when said global cache sequence reaches its maximum count.

5. The method according to claim 1, further comprising the steps of:

initializing said cache sequence number in each node to zero; and initializing said global cache sequence count to one.

6. In a network based on the Private Network to Network Interface (PNNI) standard and consisting of a plurality of nodes, a method of caching routes generated using the Dijkstra algorithm into a plurality of caches maintained on each node, each cache supporting a different class of call, said Dijkstra algorithm utilizing a PATH list in the calculation of routes, said method comprising the steps of:

maintaining N sets of variables consisting of a cache sequence number, a parent pointer and a global cache sequence count for each node wherein each set of variables is associated with a single class of call to be supported;

setting said cache sequence number, within a particular set of variables corresponding to a particular class of call, equal to said cache sequence count when the node is placed onto said PATH list; and constructing a routing list directly from parent pointers, defining a route from a destination node to a local node, if said cache sequence number, within a particular set of variables corresponding to a particular class of call, equals said cache sequence count within the set of variables thereof.

7. The method according to claim 6, further comprising the step of clearing said plurality of caches.

8. The method according to claim 7, wherein the step of clearing said cache comprises the step of incrementing the global cache sequence counts within all N sets of variables.

9. The method according to claim 6, further comprising the step of selectively clearing one of said plurality of caches associated with a particular class of call.

10. The method according to claim 9, wherein the step of clearing said cache comprises the step of selectively clearing the cache for a particular class of call by incrementing the global cache sequence count associated with the set of variables for that particular class of call.

11. The method according to claim 6, further comprising the step of clearing each of said plurality of caches, comprising the steps of:

incrementing the global cache sequence count within the set of variables associated with each class of call;

setting said global cache sequence count within the set of variables associated with each class of call to one when it reaches its maximum count; and setting said cache sequence number within the set of variables associated with each class of call on each node to zero when said global cache sequence reaches its maximum count.

12. The method according to claim 6, further comprising the step of clearing one of said plurality of caches, comprising the steps of:

incrementing the global cache sequence count associated with one selected class of call;

setting said global cache sequence count associated with one selected class of call to one when it reaches its maximum count; and setting said cache sequence number associated with one selected class of call on each node to zero when said global cache sequence reaches its maximum count.

13. The method according to claim 6, further comprising the steps of:

initializing the cache sequence number associated with one class of call in each node to zero; and initializing the global cache sequence count associated with one class of call to one.

14. The method according to claim 6, further comprising the steps of:

initializing the cache sequence number associated with all classes of calls in each node to zero; and initializing the global cache sequence count associated with all classes of calls to one.

* * * * *